(12) United States Patent
Stuckey

(10) Patent No.: US 10,549,391 B2
(45) Date of Patent: Feb. 4, 2020

(54) METHOD AND KIT FOR GEROTOR REPAIR

(71) Applicant: George D. Stuckey, Hemingway, SC (US)

(72) Inventor: George D. Stuckey, Hemingway, SC (US)

( * ) Notice: Subject to any disclaimer, the term of this patent is extended or adjusted under 35 U.S.C. 154(b) by 266 days.

(21) Appl. No.: 15/196,111

(22) Filed: Jun. 29, 2016

(65) Prior Publication Data

US 2017/0008134 A1    Jan. 12, 2017

Related U.S. Application Data

(60) Provisional application No. 62/190,815, filed on Jul. 10, 2015.

(51) Int. Cl.
| | | |
|---|---|---|
| *B23P 6/00* | (2006.01) | |
| *F04C 2/10* | (2006.01) | |
| *F01M 1/02* | (2006.01) | |
| *B60S 5/00* | (2006.01) | |

(52) U.S. Cl.
CPC .............. *B23P 6/00* (2013.01); *F01M 1/02* (2013.01); *F04C 2/102* (2013.01); *B60S 5/00* (2013.01); *F01M 2001/0238* (2013.01); *F04C 2230/70* (2013.01); *F04C 2230/80* (2013.01); *F04C 2230/85* (2013.01)

(58) Field of Classification Search
CPC .............. F04C 2230/60; F04C 2230/70; F04C 2230/80; F04C 2230/85; F04C 2240/801; F04C 2/10; F04C 2/101; F04C 2/102; F04C 2/103; F04C 18/10–103; F04C 15/0026; F04C 27/006; Y10T 29/49238; Y10T 29/49721; F01M 1/02; F01M 2001/0238; B23P 6/00; B23P 2700/50; B60S 5/00; F01C 1/10; F01C 1/102; F01C 1/103; F01C 1/104
See application file for complete search history.

(56) References Cited

U.S. PATENT DOCUMENTS

| | | | | |
|---|---|---|---|---|
| 4,519,755 | A * | 5/1985 | Hanson | F04C 23/001 417/32 |
| 6,332,522 | B1 * | 12/2001 | Morse | F16D 43/284 192/35 |
| 6,345,969 | B1 * | 2/2002 | White | F04C 2/105 418/133 |
| 6,688,866 | B2 * | 2/2004 | Lambert | F04C 2/086 418/135 |
| 9,914,356 | B2 * | 3/2018 | Simon | F16H 39/42 |
| 2005/0013690 | A1 * | 1/2005 | Borrowman | F03B 3/02 415/214.1 |
| 2011/0262288 | A1 * | 10/2011 | Leaverton | F04C 2/22 417/572 |
| 2016/0084123 | A1 * | 3/2016 | Zheng | F04C 2/102 184/31 |

OTHER PUBLICATIONS

JC Marine; "496 Water Pump Repair Kit / 496 Sea Pump Repair Kit"; available online Nov. 20, 2008 (Year: 2008).*

* cited by examiner

*Primary Examiner* — Matthew P Travers
(74) *Attorney, Agent, or Firm* — Burr & Forman LLP; Douglas L. Lineberry

(57) ABSTRACT

An improved repair method and repair kit for gerotor pumps that have become damaged or worn via insertion of a wear plate to directly contact the gerotor and engine casing in order to allow the pump to create a sound seal once more.

12 Claims, 9 Drawing Sheets

Inner Rotor

Outer Gear Ring

METHOD AND KIT FOR GEROTOR REPAIR

BACKGROUND OF THE INVENTION

1) Field of the Invention

The present invention relates to an improved method of gerotor repair for vehicles and a kit for same.

2) Background

A gerotor is a positive displacement pump. The name gerotor is derived from "Generated Rotor" and consists of an inner and outer rotor. The inner rotor has N teeth, and the outer rotor has N+1 teeth. The inner rotor is located off-center and both rotors rotate. The geometry of the two rotors partitions the volume between them into N different dynamically-changing volumes. During the assembly's rotation cycle, each of these volumes changes continuously, so any given volume first increases, and then decreases. An increase creates a vacuum. This vacuum creates suction, and hence, this part of the cycle is where the intake is located. As volume decreases compression occurs. During this compression period, fluids can be pumped, or compressed (if they are gaseous fluids).

Gerotor pumps are generally designed using a trochoidal inner rotor and an outer rotor formed by a circle with intersecting circular arcs. A gerotor can also function as a pistonless rotary engine. For instance, high pressure gas enters the intake area and pushes against the inner and outer rotors, causing both to rotate as the area between the inner and outer rotor increases. During the compression period, the exhaust is pumped out.

Although gerotors come in a variety of geometric configurations, materials, and sizes, all gerotors share the basic principle of having conjungately-generated tooth profiles which provide continuous fluid-tight sealing during operation. As the rotors rotate about their respective axes, fluid is drawn into the enlarging chamber to a maximum volume. As rotation continues, chamber volume decreases, forcing fluid out of the chamber. The process occurs constantly for each chamber, providing a smooth pumping action.

Gerotor pumps are suitable for applications as sophisticated as electronically controlled fuel pumps and as simple as low pressure oil transfer pumps and as mechanically demanding as high pressure hydraulic motors. Gerotors also typically have a lower installed cost, consume less power, use less space and have more application flexibility than virtually all other pump/motor mechanisms.

One significant feature necessary for a gerotor style pump to function is that there must be smooth surfaces on both the top and bottom of the pump. If the surface the gerotor pump contacts is not smooth, the fluid in the pump, for instance oil, will bypass from the high pressure side to the low pressure side. Without smooth surfaces, a proper seal will not form and engine efficiency and output suffers.

In vehicles such as trucks, the gerotor pump contacts the front engine cover and the gerotor pump cover plate. Because of these contacts, during use and normal wear, or because of abrasive materials being circulated in the oil system, scratches and grooves may form on these mating surfaces. If these scratches or grooves become too deep, the gerotor pump will not build adequate pressure for the system to operate. In this case, a typical repair requires the gerotor and at least a portion of the front of the engine to be dismantled to effectuate repairs in order to allow the gerotor to once again form a sound seal. This repair is both labor and time intensive. Moreover, part shortages, or discontinued gerotor models, may also slow the repair process.

Accordingly, it is an object of the present disclosure to provide an improved repair method and repair kit for gerotor pumps that have become damaged or worn in order to allow the pump to create a sound seal once more.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
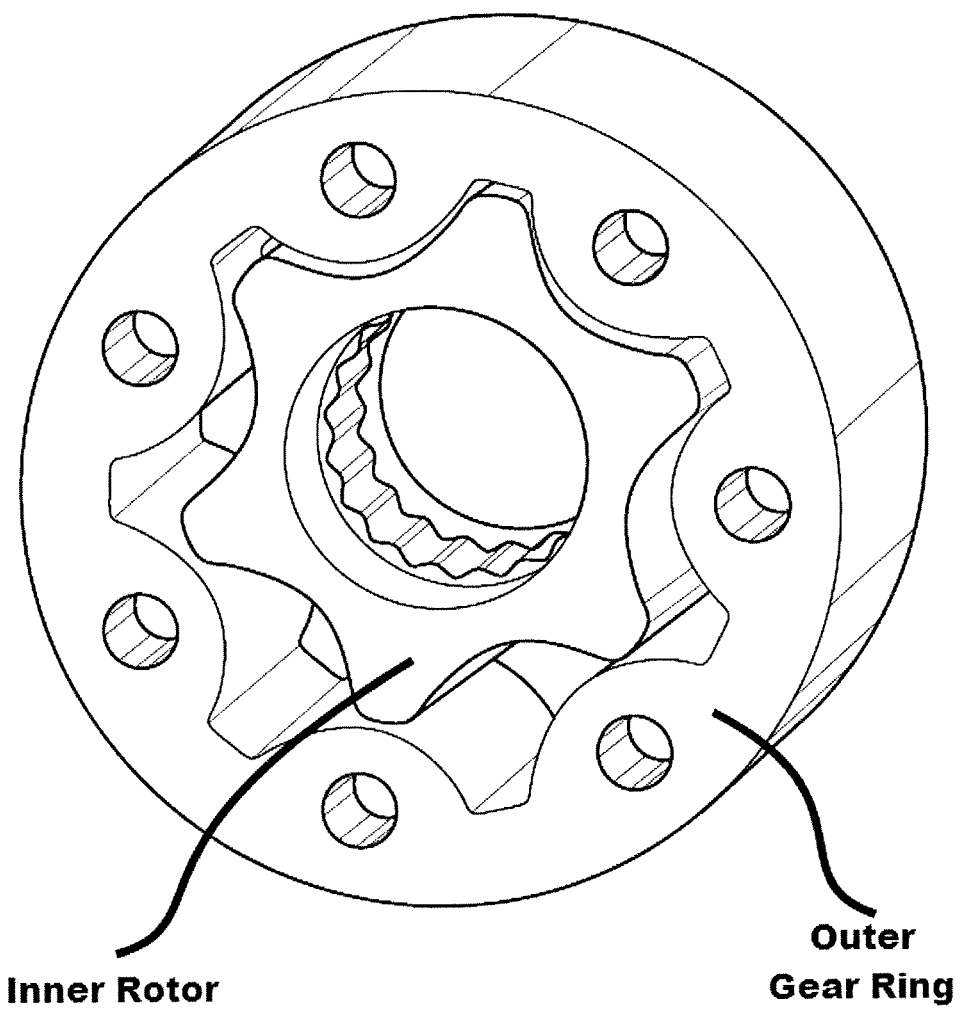
FIG. 1 shows an image of a gerotor.
Figure 2:
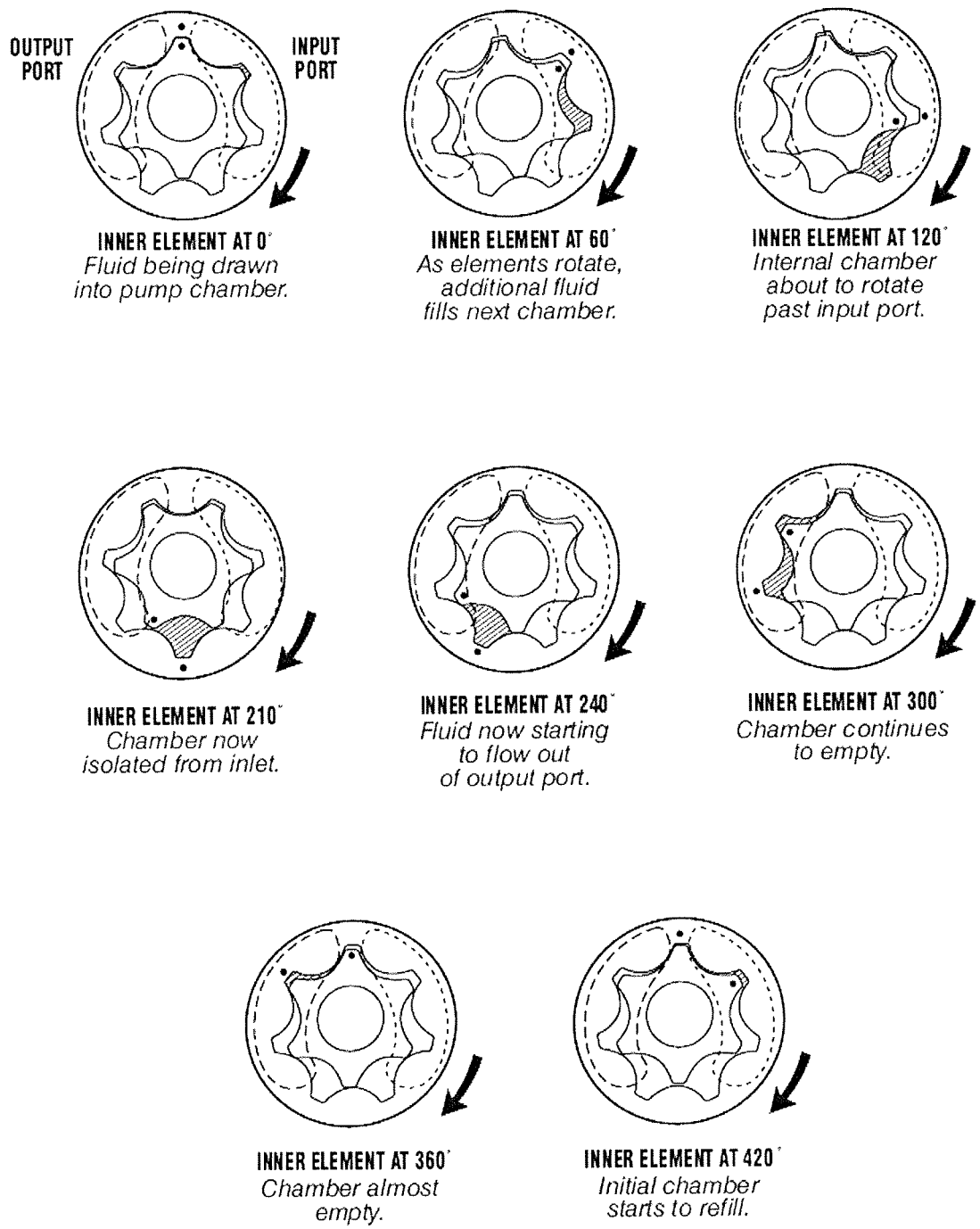
FIG. 2 shows a gerotor pumping fluid.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

SUMMARY OF THE INVENTION

In a first embodiment, the current disclosure provides a method for improving gerotor performance. The method includes inserting a wear plate within a gerotor assembly, providing a front cover piece which is placed overtop the gerotor, and performing these steps without removing a front cover of an engine. Further, the wear plate is added to a rear of a gerotor case. In another embodiment, the wear plate is shaped to conform to a front cover bottom of the engine. Still further, the wear plate is inserted to engage a lower surface of the gerotor. In another embodiment, an upper surface of the gerotor engages a lower face of the front cover piece. Even further, the front cover piece defines openings that correspond to receiving openings in the front cover of the engine. Further still, the front cover piece has a lower face sized to accommodate a thickness of the wear plate. In a further embodiment, the lower face includes a channel or groove sized to offset the thickness of the wear plate. Further, the method is performed without replacing gaskets or adding spacers to the gerotor assembly.

In another embodiment, the current disclosure provides a method for repairing an existing gerotor assembly in a vehicle. The method includes: removing a fan shroud, belt, fan clutch, and fan assembly from an engine; removing a harmonic balancer from the engine; removing a gerotor oil pump cover; removing a gerotor; removing a crankshaft seal wear ring; installing a gerotor wear plate; reinstalling the crankshaft seal wear ring; reinstalling the gerotor; installing a front cover piece that accommodates the wear plate; reinstalling the harmonic balance; and reinstalling the fan shroud, belt, fan clutch, and fan assembly. In a further embodiment, the gerotor assembly is repaired without removing an engine front cover. Still further, an existing O-ring is reused to repair the gerotor assembly. Further yet, the wear plate is shaped to conform to a front cover bottom of the engine. Even further, the wear plate is inserted to engage a lower surface of the gerotor. In a further embodiment, an upper surface of the gerotor engages a lower face of the front cover piece. Further again, the front cover piece has a lower face sized to accommodate a thickness of the wear plate. Yet further, the lower face includes a channel or groove sized to offset the thickness of the wear plate.

In another embodiment, the current disclosure provides a kit for repairing damaged gerotor assemblies in vehicles. The kit includes: a wear plate; a gerotor assembly; a front cover plate; a front seal; and a seal wear ring.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

The present disclosure is directed to an improved method of repairing a gerotor and a kit for effecting the repair. Currently, repair or replacement of a gerotor may take as long as nine hours. The current disclosure may reduce this to as little as one hour up to an hour and a half. The kit discussed infra eliminates the need to remove the engine front cover, intake manifold, turbo, water pump, radiator hoses, and coolant—which takes approximately nine hours of labor on current vehicles. Additionally, front covers for engines have been on backorder for months, thus making it highly unlikely to obtain a front cover with an unblemished surface in order to repair the gerotor assembly, thus further exacerbating the need for the improved repair process and kit of the present disclosure.

In one embodiment of the present disclosure, the front cover of the engine does not have to be removed. Indeed, in most embodiments of the current disclosure, the repair may be accomplished with a spacer or wear plate that may be inserted into the back of the gerotor case, as described in more detail infra. This repair may provide a new surface upon which to run the gerotor gear, allowing the user to reuse the factory gear and existing front cover of the engine. Additionally, an improved front cover piece may be included with the kit that accommodates the thickness of the added wear plate, which allows the user to use the original factory 'O' ring. This prevents introducing new gaskets and spacers and O-rings, thereby reducing the possibilities for leaks.

Vehicles that may be repaired with the current disclosure include, but are not limited to, NAVISTAR VT365, NAVISTAR VT275, NAVISTAR T444E, NAVISTAR MAXXFORCE 5 Navistar Maxxforce 5, NAVISTAR MAXFORCE 7, FORD POWERSTROKE 7.3L, FORD POWERSTROKE 4.5L, FORD POWERSTROKE 6.0L, FORD POWERSTROKE 6.4, and INCLINE 6.

Figure 3:
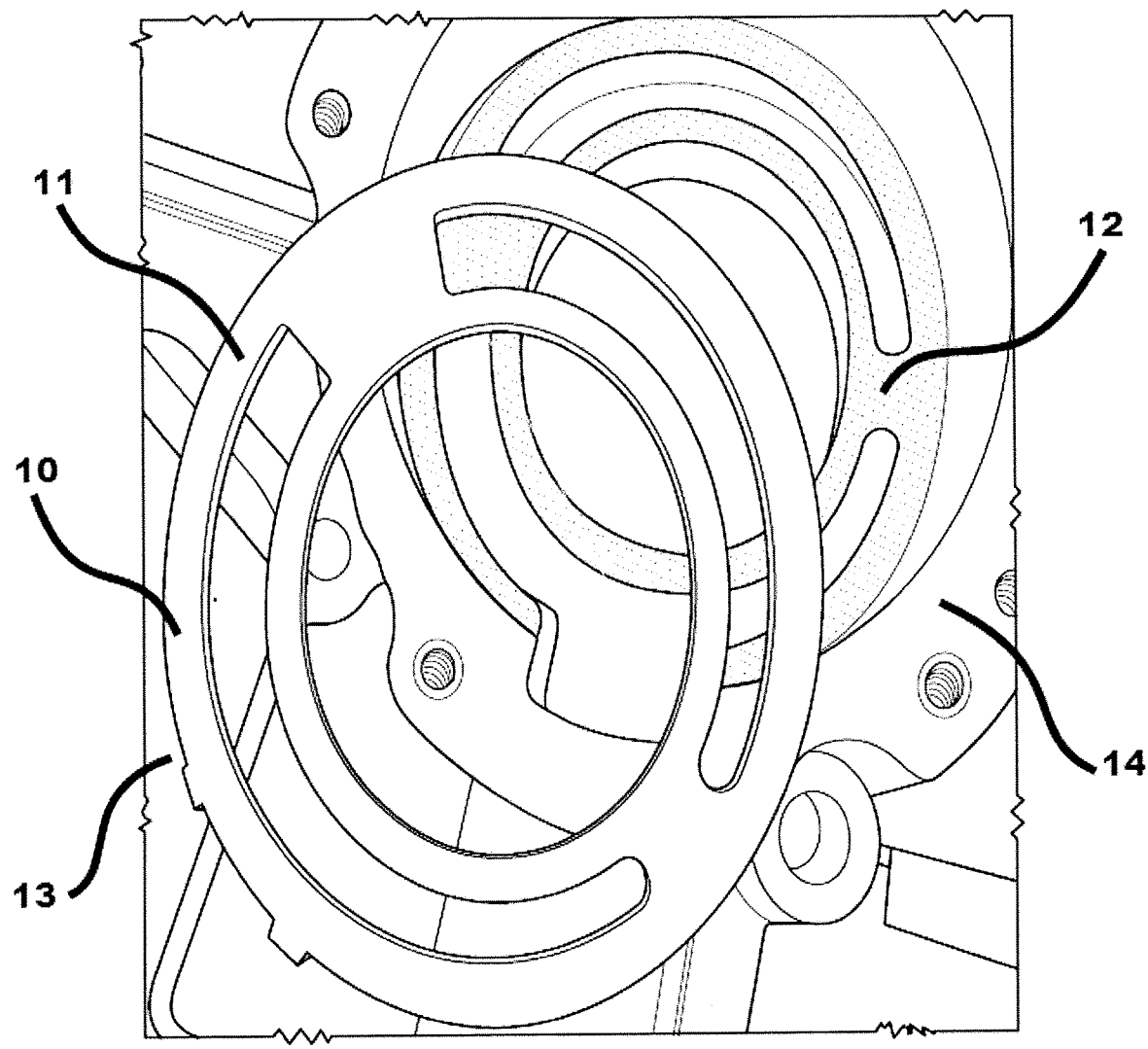
FIG. 3 shows a diagram of a repair wear plate and front engine cover.
Figure 4:
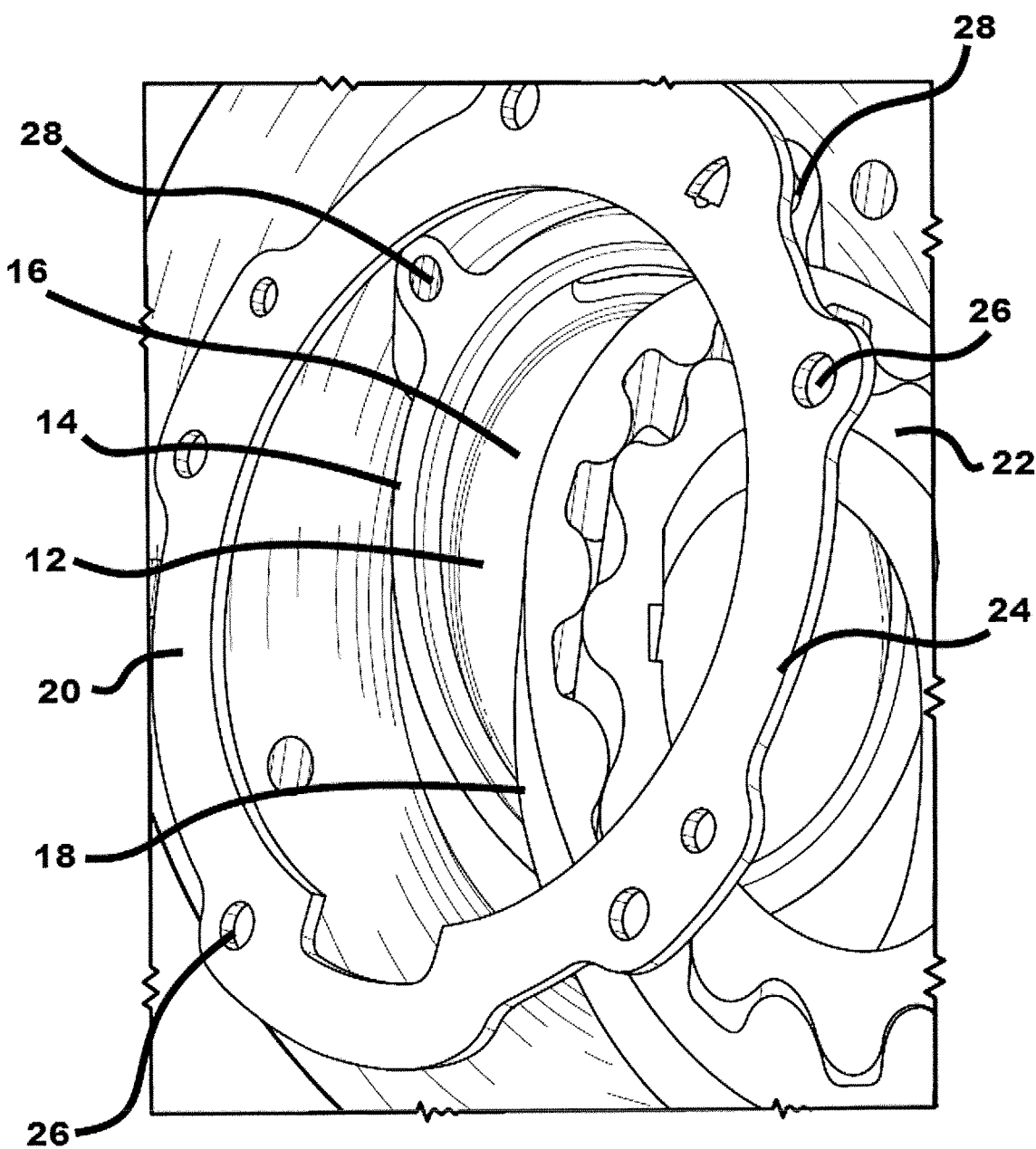
FIG. 4 shows a front engine cover and gerotor assembly.

Referring to FIGS. 3 and 4, in one embodiment, a kit is provided that includes a Wear Plate 10. Wear Plate 10 may be made from metals, such as aluminum, steel, ceramic, stainless steel, titanium, etc., as known to those of skill in the art, plastics, synthetics, etc., as known to those of skill in the art may also be used. Wear Plate 10 may be shaped to conform to bottom 12 of front cover 14 that engages gerotor 16, see FIG. 4. Wear plate 10 may be inserted into the bottom 12 of front cover 14 and engage lower surface 18 of gerotor 16, see FIG. 4.

Once wear plate 10 is inserted, gerotor 16 may be placed atop wear plate 10. Lower surface 18 of gerotor 16 would engage upper surface 11 of wear plate 10 while lower surface 13 of wear plate 10 would engage bottom 12 of front cover 14. Then a front cover 32, see FIG. 5, or ring 20 may be placed overtop gerotor 16 with openings 26 allowing for securing the ring to front cover 14.

Figure 5:
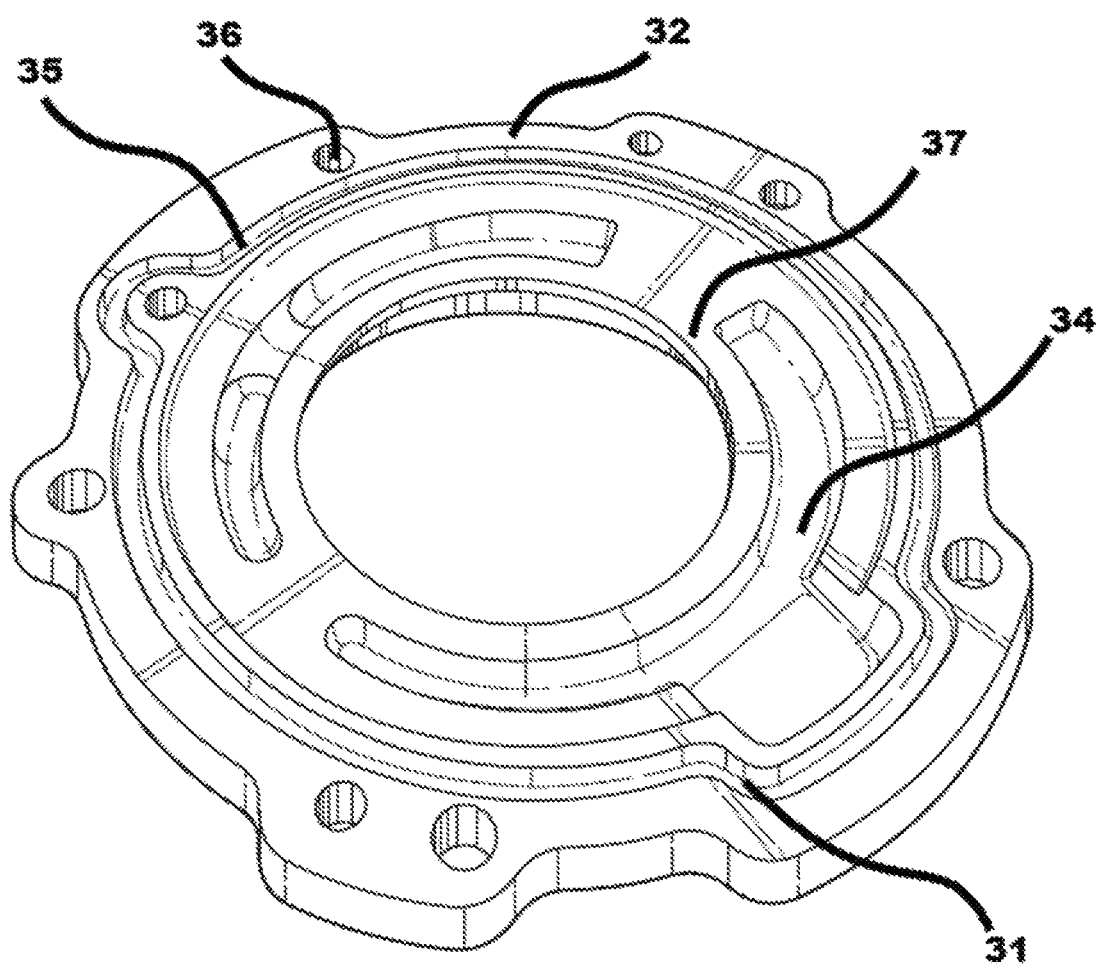
FIG. 5 shows the lower surface of one embodiment of a front cover plate of the current disclosure.

Referring to FIGS. 4 and 5, upper surface 22 of gerotor 16 may engage lower face 34 of front cover piece 32. In a further embodiment, front cover piece 32 may be secured in place via defining openings 36 that match receiving openings 28, see FIG. 4, in front cover 14. Screws, bolts, or other fasteners as known to those of skill in the art may then be used to fasten front cover piece 32 to front cover 14. Front cover piece 32 may also include an 'O' Ring 35 contained within a channel 37 defined within lower face 34 of front cover piece 32.

Figure 6:
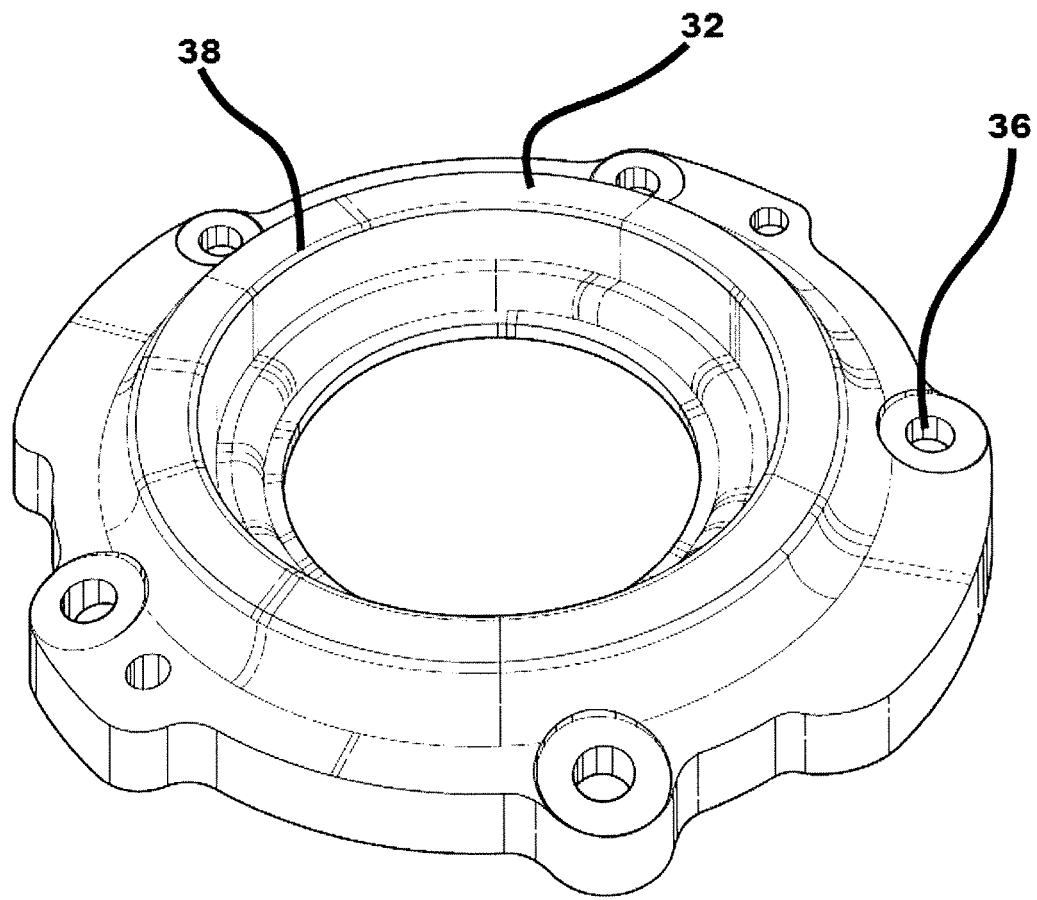
FIG. 6 shows the upper surface of one embodiment of a front cover plate of the current disclosure.

Front cover piece 32 may have lower face 34 sized to accommodate the thickness of wear plate 10. For instance, lower face 34 may have a channel or groove 31 that is specifically sized to offset the thickness of wear plate 10 introduced into front cover 14. The depth of channel 37 may range from 0.005 to 0.200 mm. FIG. 6 shows one possible embodiment of upper surface 38 of front cover piece 32.

The significant improvement of the present disclosure may be illustrated in comparing the existing gerotor repair process with that of the current disclosure. Originally, the repair process involved removing the intake from the engine. Then removing the fan shroud, belt, fan clutch and fan assembly. Engine coolant was then removed followed by the radiator hoses. The water pump was removed along with the harmonic balancer. Then the gerotor oil pump cover was removed followed by the gerotor oil pump. The engine front cover was then removed as well as the crank shaft seal wear ring.

The repair then consisted of installing a seal wear ring as well as a new engine front cover with new gaskets. A new crank shaft wear ring seal was added. Then the gerotor oil pump was installed along with a new seal. The harmonic balance was then reinstalled along with the water pump. Radiator hoses were then reconnected and the engine filled with new coolant. The fan clutch, fan assembly, belt and fan shroud were then reinstalled. The fan assembly was installed and the intake assembly was reinstalled. This repair process took approximately nine hours of mechanic labor.

Figure 7:
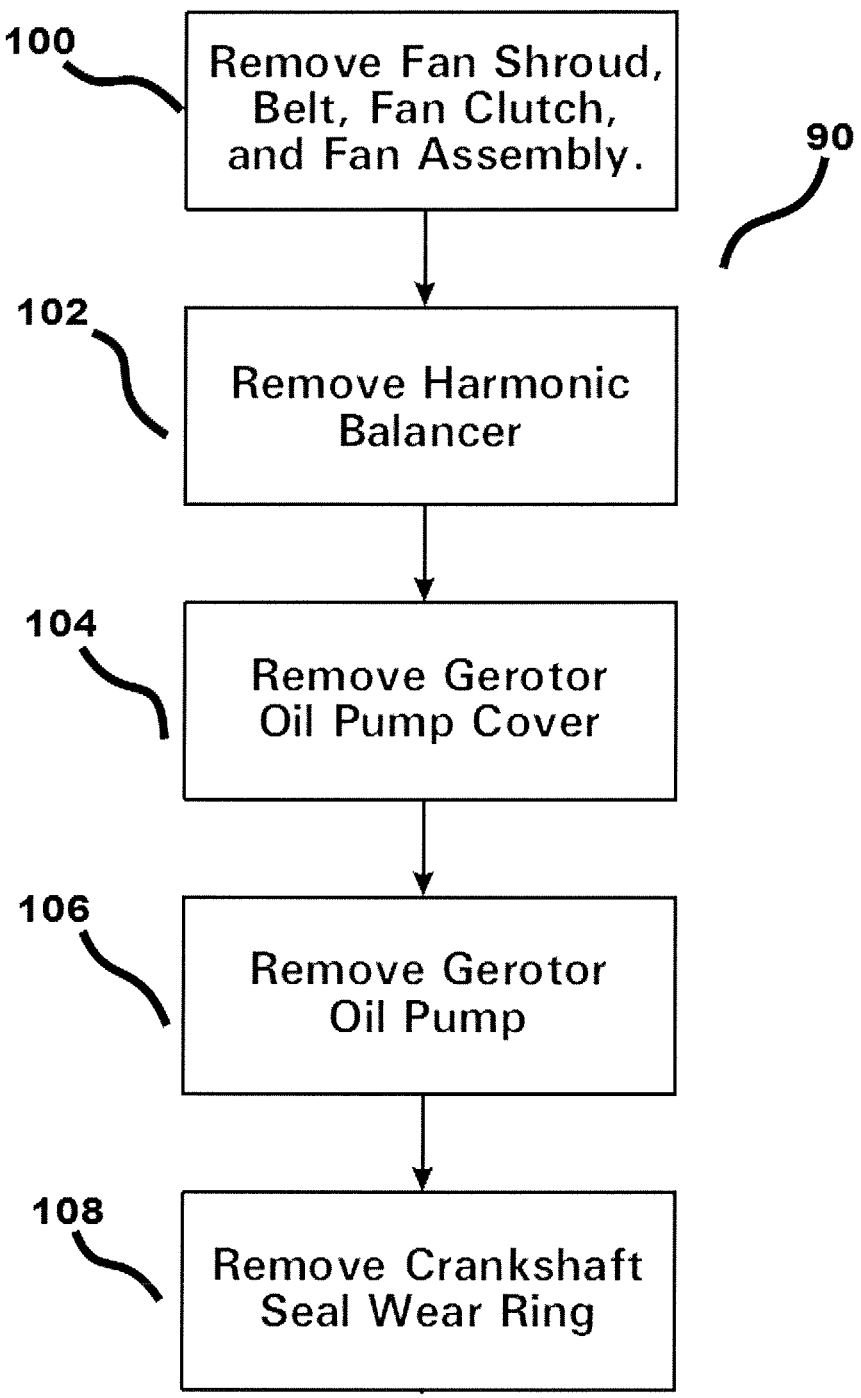
FIG. 7 shows a flow chart of a tear down process of the current disclosure.

FIG. 7 shows a flow diagram of the tear down process 90 for the current disclosure. At step 100, the fan shroud, belt, fan clutch, and fan assembly are removed. At step 102 the harmonic balancer is removed. Step 104 shows the gerotor oil pump cover being removed. At step 106 the gerotor oil pump is removed. At step 108, the crankshaft seal wear ring is removed.

Figure 8:
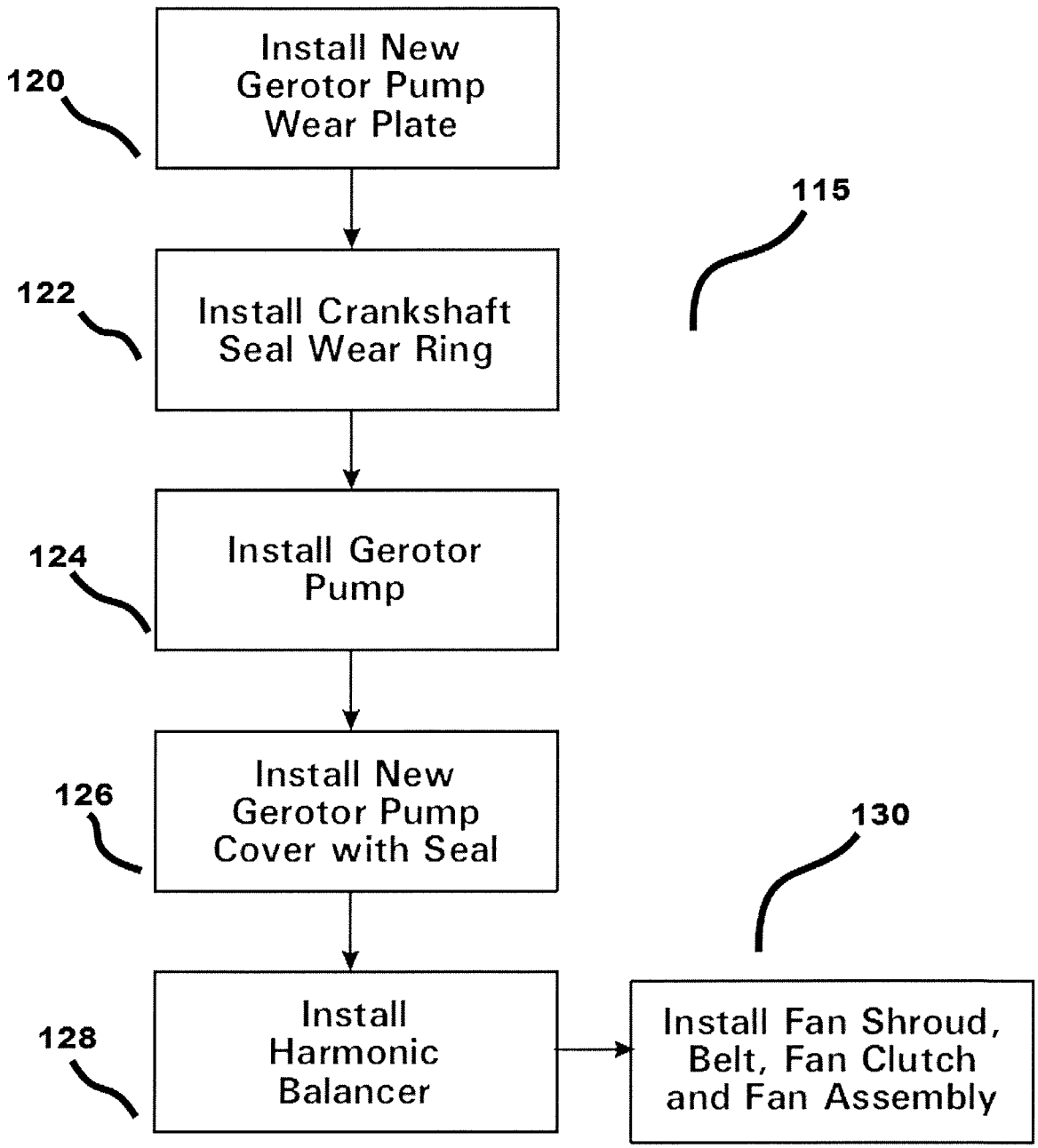
FIG. 8 shows a flow chart of a repair process of the current disclosure.

FIG. 8 shows a flow diagram of install process 115 for the current disclosure. At step 120, a gerotor pump wear plate is installed. At step 122, the crankshaft seal wear ring is installed. At step 124, the gerotor pump is installed. At step 126, new gerotor pump cover with seal is installed. Step 128 shows the harmonic balancer being reinstalled. Finally, at step 130, the fan shroud, belt, fan clutch, and fan assembly is installed.

Figure 9:
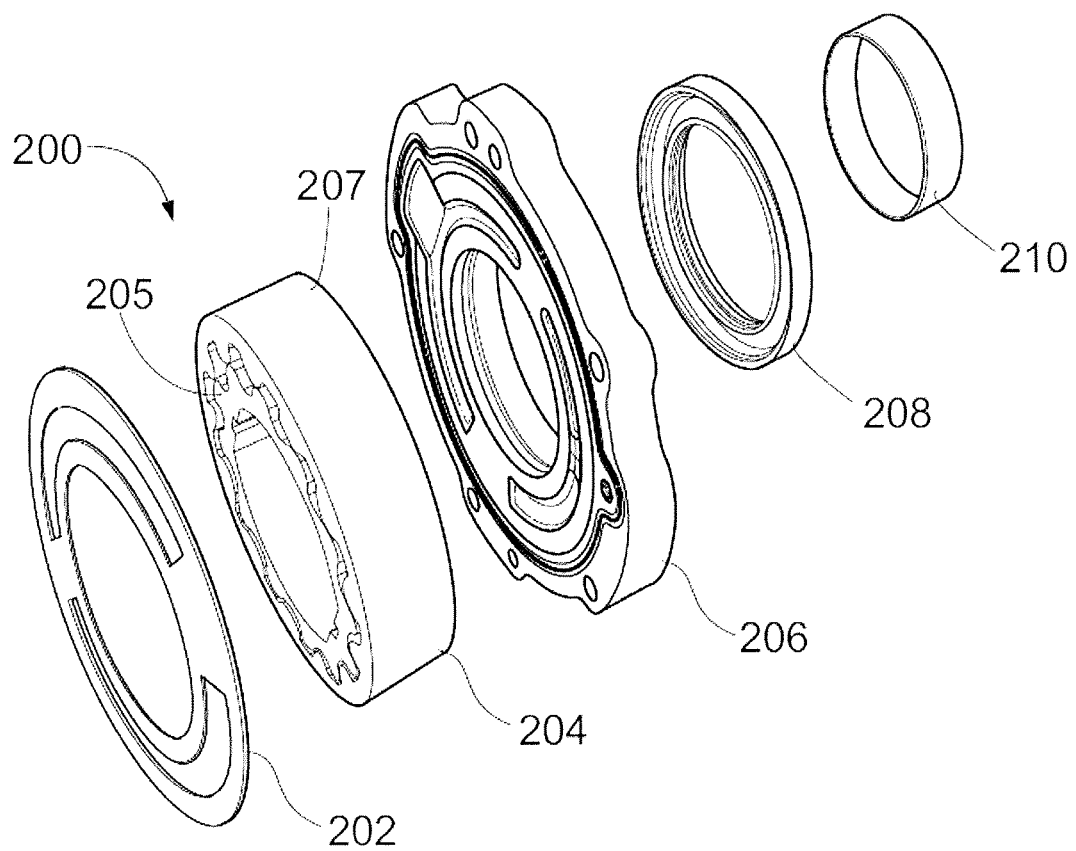
FIG. 9 shows the contents of a kit as per one embodiment of the current disclosure.

FIG. 9 shows one embodiment of a kit of the present invention. Kit 200 may contain a wear plate 202, a gerotor assembly 204, which may include inner rotor 205 and outer gear ring 207, front cover plate 206, front seal 208, and seal wear ring 210. During installation, a pliable substance may be bonded to the bottom of the wear plate to assure a good seal. In a further embodiment, screws, bolts, or other fasteners as known to those of skill in the art, may be used to secure the new front cover plate to the damaged engine front cover. In certain repairs, not all items of the kit may be used depending on the nature of the damage to the gerotor gear assembly and/or the front cover of the engine.

In a further embodiment, not shown, the kit may include a wear plate, gerotor oil pump, billet oil pump cover, cover gasket, bolt kit, crank shaft seal ring, seal wear ring, Loctite®, and Molly Lube™.

Other possible repairs are also envisioned within the scope of this disclosure. For instance, in another embodiment, only a wear plate may be inserted into the front engine cover and a new pump cover may be machined to compensate for the thickness added by the wear plate. The new pump cover would be made to compensate for the repair plate raising the height of gerotor inside the front cover.

In a further embodiment, the wear plate may be made to conform to the bottom of the front cover making a smooth, flat sealing surface for the gerotor oil pump. However, instead of machining or introducing a new front cover plate, the gerotor pump may be made thinner by cutting or other methods as known to those of skill in the art to offset the thickness of wear plate.

In a still further embodiment, a cup or insert molded or otherwise machined, as known to those of skill in the art, to fit the gerotor cavity of the front engine cover may be inserted into the front engine cover. The cup may have a shoulder to which the gerotor would mount. In this embodiment, a new gerotor would be made with a smaller outer diameter to offset the increase in diameter caused by the cup or insert.

In another embodiment, the front engine cover may be removed and the cavity gerotor occupies may be machined to a larger diameter. An insert may be made with the same diameter and same profile as the original cavity bottom. This cup would be pressed into the cavity creating a new sealing surface. Then a new front cover piece may be used to allow attachment of the pump cover.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for improving gerotor performance in an engine comprising:
   inserting an unaffixed wear plate within a gerotor assembly of an internal combustion engine into a rear of a gerotor case defined within a front engine cover such that the unaffixed wear plate is in direct contact with a bottom of the front engine cover as well as in direct contact with a lower surface of the gerotor, further the unaffixed wear plate defines a central opening and at least two wear plate orifices defined within a body of the unaffixed wear plate, wherein the at least two wear plate orifices correspond to and mirror at least two openings defined in the bottom of the front engine cover;
   providing a front cover piece which is placed overtop the gerotor wherein the front cover piece seals the unaffixed wear plate and gerotor within the gerotor assembly of the internal combustion engine front engine cover, the front cover piece further comprising at least two openings that mirror the unaffixed wear plate orifices and the at least two openings defined in the bottom of the front engine cover; and
   performing the above steps without removing the front engine cover.

2. The method of claim 1, wherein an upper surface of the gerotor engages a lower face of the front cover piece.

3. The method of claim 1, wherein the front cover piece defines openings that correspond to receiving openings in the front engine cover.

4. The method of claim 1, wherein the front cover piece has a lower face sized to accommodate a thickness of the wear plate.

5. The method of claim 4, wherein the lower face includes a channel or groove sized to offset the thickness of the wear plate.

6. The method of claim 1, wherein the method is performed without replacing gaskets or adding spacers, excluding the wear plate, to the gerotor assembly.

7. A method for repairing an existing gerotor assembly in a vehicle comprising:
removing a fan shroud, belt, fan clutch, and fan assembly from an engine;
removing a harmonic balancer from the engine;
removing a gerotor oil pump cover;
removing a gerotor;
removing a crankshaft seal wear ring;
installing an unaffixed gerotor wear plate into a rear of a gerotor case defined within a front engine cover of the engine such that the unaffixed wear plate is in direct contact with a bottom of the front engine cover as well as in direct contact with a lower surface of the gerotor, further the unaffixed wear plate defines a central opening and at least two one wear plate orifices defined within a body of the unaffixed wear plate, wherein the at least two wear plate orifices correspond to and mirror at least two openings defined in the bottom of the front engine cover;
reinstalling the crankshaft seal wear ring;
reinstalling the gerotor;
installing a front cover piece that accommodates the unaffixed wear plate wherein the front cover piece seals the unaffixed wear plate and gerotor within the gerotor assembly of the front engine cover, the front cover piece further comprising at least two openings that mirror the wear plate orifices and the at least two openings defined in the bottom of the front engine cover;
reinstalling the harmonic balancer; and
reinstalling the fan shroud, belt, fan clutch, and fan assembly.

8. The method of claim 7 wherein the gerotor assembly is repaired without removing the front engine cover.

9. The method of claim 7, wherein an existing O-ring is reused to repair the gerotor assembly.

10. The method of claim 7, wherein an upper surface of the gerotor engages a lower face of the front cover piece.

11. The method of claim 7, wherein the front cover piece has a lower face sized to accommodate a thickness of the wear plate.

12. The method of claim 11, wherein the lower face includes a channel or groove sized to offset the thickness of the wear plate.

* * * * *